Jan. 28, 1969   D. PIMENTEL   3,424,333
OUTLET BOX WITH COVER AND MOUNTING CLIPS THEREFOR
Filed March 27, 1967
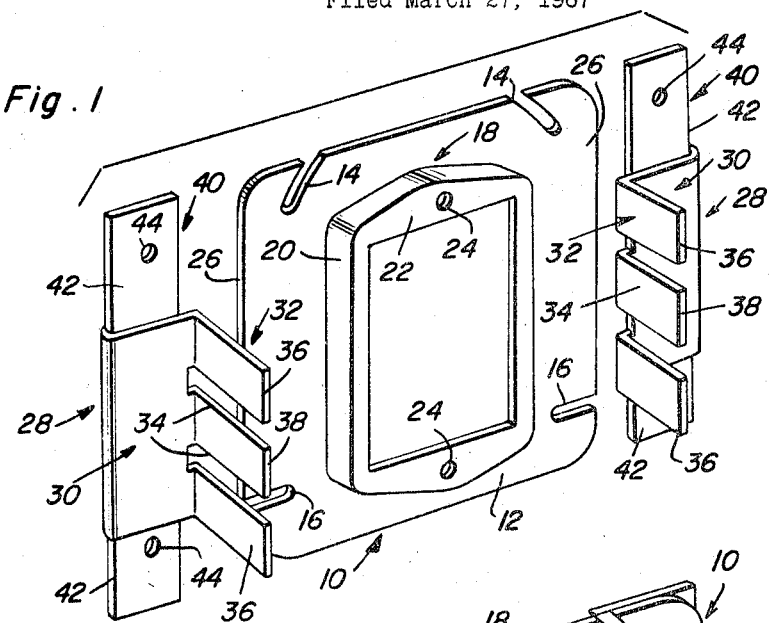
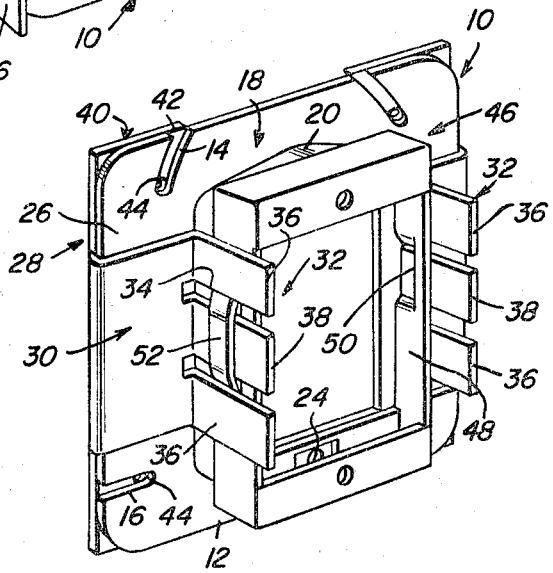
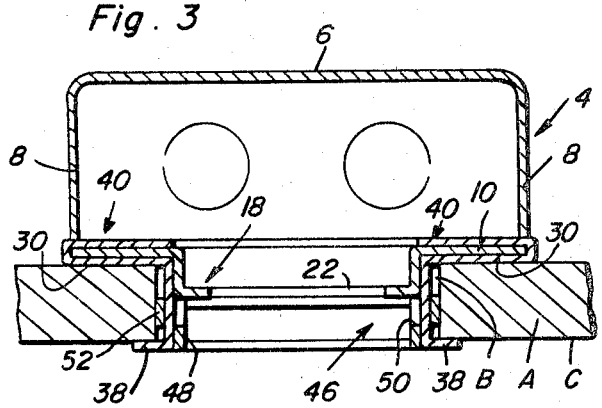
Demetrio Pimentel
INVENTOR.
BY *Clarence A. O'Brien*
and *Harvey B. Jacobson*
Attorneys

United States Patent Office 3,424,333
Patented Jan. 28, 1969

3,424,333
OUTLET BOX WITH COVER AND MOUNTING CLIPS THEREFOR
Demetrio Pimentel, Brooklyn, N.Y.
(145—49 178th Place, Springfield Gardens, N.Y. 11434)
Continuation-in-part of application Ser. No. 572,313, Aug. 15, 1966. This application Mar. 27, 1967, Ser. No. 626,316
U.S. Cl. 220—3.6                         4 Claims
Int. Cl. H02g 3/12, 3/14; H05k 5/03

ABSTRACT OF THE DISCLOSURE

An outlet box, a cover plate, and mounting clips are attached to a construction surface, for example, a wallboard panel or room wall. The outlet box is a conventional cup-shaped open front type. The cover plate has a conventional centralized collar with a turned-in flange. The improvement comprises a pair of mounting clips which can be (1) bent around marginal edge portions of the cover plate and (2) and which have outstanding limbs which project through the wall opening and have bendable terminal ends clenched firmly against the room wall.

Background of the invention

This application is a continuation-in-part of my copending application for patent directed to an Outlet Box With Cover and Mounting Means Therefor, Ser. No. 572,313, filed Aug. 15, 1966.

The present invention relates to an electrician's outlet box, a cover plate therefor, and clip means carried by the cover plate. The box is a rectangular cup-like conventional open-front type. The cover plate too is conventional, has a centralized outstanding collar and when applied substantially closes the open-front of the box. The mounting clips, which are new and improved are cooperatively connected, not with the box, but with the cover plate and are bendably attachable to the construction surface without requiring the use of headed fasteners, such as are usually employed.

The foregoing statement of this invention is not intended to imply that it is a novel concept to join a pair of bendable mounting clips to a cover plate for an outlet box. Several forms of paired mounting clips—which are carried by diametrically opposite portions of a generally rectangular cover plate—are shown, described and claimed in my copending application, Ser. No. 572,313, and with which the instant matter should be compared to more fully comprehend the over-all background. With reference, more particularly, to Ser. No. 572,313 as indicative of the prior art, it will be recognized that, generically interpreted, each clip is characterized as having an L-shaped body portion defining long and short limbs. Also, the long limb is of a length that it is capable of being projected outwardly through and beyond a hole in the construction or wall surface (FIG. 3) in a manner to permit the projecting free end portion to be caught hold of with the jaws of a pair of pliers and bent outwardly and then forcibly clenched and bound against the exterior of the wall surface in a manner to anchor the limb in its intended place. With both limbs thus applied the over-all assemblage, box and cover will be properly installed without requiring the use of headed fasteners.

It is also advisable in setting forth the background to further explain that the short limb in each of the L-shaped clips varies in construction in that it is connected with the coacting portion of the cover plate in an individually distinct manner. In this field of endeavor it is frequently necessary to employ an extension rim, that is, an auxiliary or supplemental collar, in order to cope with a situation wherein the covered outlet box has been installed or set too deeply in the wall. In this situation the L-shaped or equivalent clips are such in construction that they serve not only to anchor the plate-covered box but the extension rim too.

An object in the instant matter is to structurally and functionally improve upon the several forms or embodiments of clips which are revealed in Ser. No. 572,313 and, more particularly, to improve upon the embodiment identified as FIG. 8 in the pending application as will be hereinafter more fully disclosed.

Summary

In carrying out the underlying principles of the present invention the paired cover attaching, box mounting and anchoring clips are each the same in construction and as before suggested each clip is characterized by a sheet material L-shaped portion which has one limb which overlies the cover plate and another outwardly laterally directed limb which abuts the coacting margin of the usual cover plate collar and which latter is provided with slots defining several attaching and retaining fingers whose outer ends are laterally bendable as before set forth. In addition the first-named arm of the L-shaped portion is provided with an elongated adapter flange which is superimposed upon the inner surface of the cover plate and is provided at its respective ends with holes to accommodate headed screw-threaded or equivalent fasteners.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing

FIG. 1 is a view in perspective showing a substantially conventional cover plate for an equally conventional outlet box (FIG. 3) and wherein the left and right mounting clips are detached and in readiness to be installed.

FIG. 2 is a view in perspective similar to FIG. 1 and wherein the two mounting clips are not only fully installed, but are used in conjunction with the aforementioned extension collar or rim whereby to achieve the result shown in FIG. 3.

FIG. 3 is a horizontal section wherein the box, cover plate and auxiliary rim are arranged to provide an assemblage which is clipped in place when the free outer ends of the several fingers are bent to assume the anchoring position shown.

Description of the preferred embodiment

Reference is made first to FIG. 3 wherein the aforementioned "construction surface" is shown in the form of a wall panel A having an outlet box opening B formed therein. The electric outlet box is denoted at 4 and is of a common rectangular cup-like type and embodies an inner or back wall 6 and encompassing marginal rim-forming walls 8. Referring now to FIG. 1, the rectangular cover plate which is used to close the open front of the box 4 is denoted by the numeral 10 and comprises a flat faced plate 12 the corner portions of which are provided with customary kerfs or notches 14 and 16 which in practice serve to accommodate screws (not shown) for mounting the cover plate on and attaching it to the open front of the box 4. The centrally apertured portion of the cover plate is provided with the usual integral embossment 18 conveniently referred to here as a piloting and positioning collar or neck and which in practice fits into the hole B in the wall as shown in FIG. 3. This collar comprises an endless rim 20 having a turned-in endless flange 22 providing the customary lip means and which in turn is provided with upper and lower screw-threaded holes 24 for attachment thereto of a switch or receptacle concealing plate (also not shown). The right and left hand marginal portions, which are conventional, are designated at 26 merely to designate the portions on which the improved attaching or mounting clips are fittingly mounted as shown in FIGS 2 and 3. Each clip is the same in construction and a description of one will suffice for both. Each clip is characterized by a substantially L-shaped part which is denoted by the numeral 28 and accordingly embodies a first limb 30 (also a short limb) which in use is superimposed upon the surface of the cover plate with which it cooperates in the manner shown in FIGS. 2 and 3. The other limb or leg which projects forwardly or outwardly is denoted, as an entity by the numeral 32. The expression L-shaped is employed here to properly tie-in the improved embodiment with the generally L-shaped clips which are shown in the aforementioned pending application. Ser. No. 572,313. It will be noted however that there are modifications here in that each leg or limb 32 has a pair of slots 34 which are arranged in parallelism and serve to define several coplanar bendable fingers the upper and lower ones of which are denoted at 36 and the intervening or central one by the numeral 38. Continuing with the details of the improved L-shaped clip it will be noted that it includes a significant feature which is described as an attaching flange 40 and which in effect is an adapter and is of a length corresponding to that portion of the cover plate with which it cooperates as is clearly brought out in FIG. 2. This is to say the flange or adapter 40 has extended end portions 42 which in turn are provided with fastener holes 44 which when the adapter or flange is in position line up with the aforementioned slots or notches 14 and 16 to accommodate the aforementioned fasteners.

As will be evident from FIG. 1 the paired attaching or mounting clips 28 can be applied for use with or without the auxiliary collar or rim more specifically the extension rim 46. Manifestly, this part 46 is also conventional and corresponds in dimension with the collar 18 and in fact is lined up with it as brought out in both FIGS. 2 and 3 when it is brought into play. It embodies frame members 48 with intermediate slits 50 which define suitably deformed keepers or bends 52. It follows that when the assembling and retaining clips are installed in the manner shown in FIG. 2 the upper and lower fingers 36 simply rest against the aligned components of both collars 18 and 46 while the central finger 38 passes through and beyond the keeper 52. Consequently when the thus augmented cover is joined with the box, the box and cover can be readily installed for use in the manner shown in FIG. 3. To the ends desired the outer bendable end portions of the several fingers 36 and 38 are bent outwardly and then clenched against the surface C of the wall. This can be accomplished with the use of a pair of pliers and it will be noted too that it is not necessary to resort to the use of headed fasteners to anchor the cover plate.

It is submitted that the features and advantages which attend this significant advance in the art should be self-evident from the description and drawings. Accordingly, a more extended description is deemed to be unnecessary.

I claim:

1. For use in conjunction with cables, conduits, electricity conducting wires and the like; a conventional-type cup-like electrical outlet box having a rear wall marginally surrounded by a complemental rim wall and having built-in knockout plugs and open at its front, a readily applicable cover plate abutting and spanning said open front and having a centrally apertured portion marginally encompassed by an outwardly forwardly projecting collar with a turned-in flange and designed and adapted to fit conformingly and telescopingly into a hole provided therefor in a hard wall or similar prefabricated wall panel, and clip means cooperable with predetermined portions of said cover plate, whereby the latter, and consequently said outlet box, can be capably oriented, aligned with, and reliably anchored in place in and relative to said hole, and wherein said clip means is characterized by at least one pair of clips, each clip having a substantially L-shaped portion embodying first and second limbs, said first limb being superimposed upon the front surface of said cover plate, and a forwardly outwardly projecting second limb, said second limb bearing against the collar constituting a component part of said cover plate and being of a length that it is adapted to project outwardly through and beyond the hole in said wall panel in a manner to permit free end portions to be laterally and outwardly bent and clenched against said wall panel, said first leg being provided with a spaced parallel complemental adapter flange, said adapter flange being adapted to be superimposed upon a coacting rear surface of said cover plate.

2. The combination defined in and according to claim 1 and wherein said second limb is provided with spaced parallel open-ended slots defining several coplanar independent fingers, said fingers being of a length to coact not only with said collar, but with an additional alined auxiliary collar.

3. The combination defined in and according to claim 2 and wherein said adapter flange comprises a flange which while relatively narrow, is of a length corresponding with the dimension of that portion of the cover plate with which it is cooperable, the end portions of said flange projecting beyond coacting edge portions of said first leg and having holes therein to accommodate insertable and removable headed or equivalent fasteners.

4. As a new article of manufacture, a mounting and anchoring clip designed and adapted to cooperate with and retain a cover plate for an electric outlet box having an open front and wherein said cover plate is provided centrally with an integral projecting collar for use alone or in combination with an auxiliary but complemental extension collar, said clip having an L-shaped portion embodying a first limb which is adapted to reside in contact with a coacting front surface of the cover plate, and a second limb at right angles to the plane of said first limb, said second limb being slotted and providing a plurality of bendable fingers capable of projecting through and beyond a hole provided therefor in a wall or construction surface, said first limb provided along an outward edge thereof with a reversely bent spaced parallel relatively long and narrow flange constituting an adapter, said adapter being of a prescribed width and length and having end portions projecting beyond coacting marginal edge portions of said first limb and said end portions being provided with holes to accommodate insertable and removable fasteners for said clip.

References Cited

UNITED STATES PATENTS

| | | | |
|---|---|---|---|
| 2,286,898 | 6/1942 | Cover | 220—3.6 |
| 2,374,622 | 4/1945 | Rugg | 174—58 |
| 3,184,191 | 5/1965 | Esoldi | 220—3.6 X |

THERON E. CONDON, *Primary Examiner.*

J. R. GARRETT, *Assistant Examiner.*

U.S. Cl. X.R.

174—58